United States Patent
Trede et al.

(10) Patent No.: US 9,359,995 B2
(45) Date of Patent: Jun. 7, 2016

(54) APPARATUS FOR ROTATING THE NACELLE OF A WIND TURBINE

(75) Inventors: Alf Trede, Immerstedt (DE); Matthias Bruckner, Rendsburg (DE)

(73) Assignee: SENVION SE, Hamburg (DE)

( * ) Notice: Subject to any disclaimer, the term of this patent is extended or adjusted under 35 U.S.C. 154(b) by 531 days.

(21) Appl. No.: 13/821,488

(22) PCT Filed: Nov. 16, 2011

(86) PCT No.: PCT/EP2011/005764
§ 371 (c)(1),
(2), (4) Date: Mar. 7, 2013

(87) PCT Pub. No.: WO2012/076113
PCT Pub. Date: Jun. 14, 2012

(65) Prior Publication Data
US 2013/0170989 A1 Jul. 4, 2013

(30) Foreign Application Priority Data
Dec. 10, 2010 (DE) .......................... 10 2010 054 153

(51) Int. Cl.
*F03D 1/06* (2006.01)
*F03D 7/02* (2006.01)

(52) U.S. Cl.
CPC ................ *F03D 1/06* (2013.01); *F03D 7/0204* (2013.01); *F03D 7/0244* (2013.01);
(Continued)

(58) Field of Classification Search
CPC ......... F03D 1/00; F03D 7/0244; F03D 7/248; F03D 7/0204; F03D 7/0212; F03D 1/06; Y02E 10/721; Y02E 10/722; Y02E 10/723; Y02E 10/726
USPC .......... 290/55; 416/1, 14, 17, 32, 41, 61, 500; 415/1, 4.3, 4.5, 17, 18, 51, 119, 123, 415/124.1, 908
See application file for complete search history.

(56) References Cited

U.S. PATENT DOCUMENTS

| | | | |
|---|---|---|---|
| 6,176,675 B1 * | 1/2001 | Engstrom | F03D 7/0204 415/123 |
| 2005/0196280 A1 * | 9/2005 | Gonzalez | F03D 7/0204 416/131 |

(Continued)

FOREIGN PATENT DOCUMENTS

| | | | | |
|---|---|---|---|---|
| DE | 10 2008 004948 A1 | 7/2009 | | |
| DE | 102008004948 A1 * | 7/2009 | ............ | F03D 7/0204 |

(Continued)

OTHER PUBLICATIONS

English Translation of the International Preliminary Report on Patentability dated Jun. 12, 2013 in corresponding International Application No. PCT/EP2011/005764, filed Nov. 16, 2011.

*Primary Examiner* — Alexander Comley
(74) *Attorney, Agent, or Firm* — Rankin, Hill & Clark LLP

(57) ABSTRACT

The present invention provides an apparatus for the controlled rotation of a nacelle of a wind turbine, which includes a control device and n of yaw brakes. In standstill operation, the n yaw brakes are actuated to impart a standstill holding moment M1 for holding the nacelle, and the n yaw brakes impart a substantially equal first holding moment. In tracking operation, the n yaw brakes are actuated to impart a tracking holding moment, M2, which is lower than the standstill holding moment M1 (M1>M2). The control device, in tracking operation, actuates a number m of the n yaw brakes to generate substantially the same constant holding moment M3, where M1/n>M3>M2/n, and where the other (n−m) yaw brakes are actuated to generate substantially the same constant holding moment M4, where m*M3+(n−m)*M4~=M2, and M1/n>M2/n>M4.

12 Claims, 9 Drawing Sheets

(52) U.S. Cl.
CPC ...... *F05B 2260/902* (2013.01); *F16C 2360/31* (2013.01); *Y02E 10/721* (2013.01); *Y02E 10/723* (2013.01); *Y02E 10/726* (2013.01)

(56) References Cited

U.S. PATENT DOCUMENTS

| | | | |
|---|---|---|---|
| 2007/0116572 A1* | 5/2007 | Barbu | F03D 7/0224 416/132 B |
| 2008/0084068 A1* | 4/2008 | Shibata | F03D 1/025 290/44 |
| 2008/0131279 A1* | 6/2008 | Behnke | F03D 7/0204 416/26 |
| 2010/0109327 A1* | 5/2010 | Nielsen | F03D 7/0204 290/44 |
| 2010/0314884 A1* | 12/2010 | Ollgaard | F03D 11/04 290/55 |
| 2011/0049884 A1* | 3/2011 | Rosenvard | F03D 7/0204 290/44 |
| 2011/0135465 A1* | 6/2011 | Braicks | F03D 7/0248 416/1 |
| 2011/0171022 A1* | 7/2011 | Behnke | F03D 7/0204 416/1 |
| 2011/0268555 A1* | 11/2011 | Neumann | F03D 7/0248 415/2.1 |
| 2011/0309620 A1* | 12/2011 | Fujino | F03D 7/0204 290/44 |

FOREIGN PATENT DOCUMENTS

| | | | |
|---|---|---|---|
| EP | 1 650 431 A2 | 4/2006 | |
| JP | 2006307653 | * 9/2006 | ............ F03D 7/04 |
| JP | 2006 307653 A | 11/2006 | |

* cited by examiner

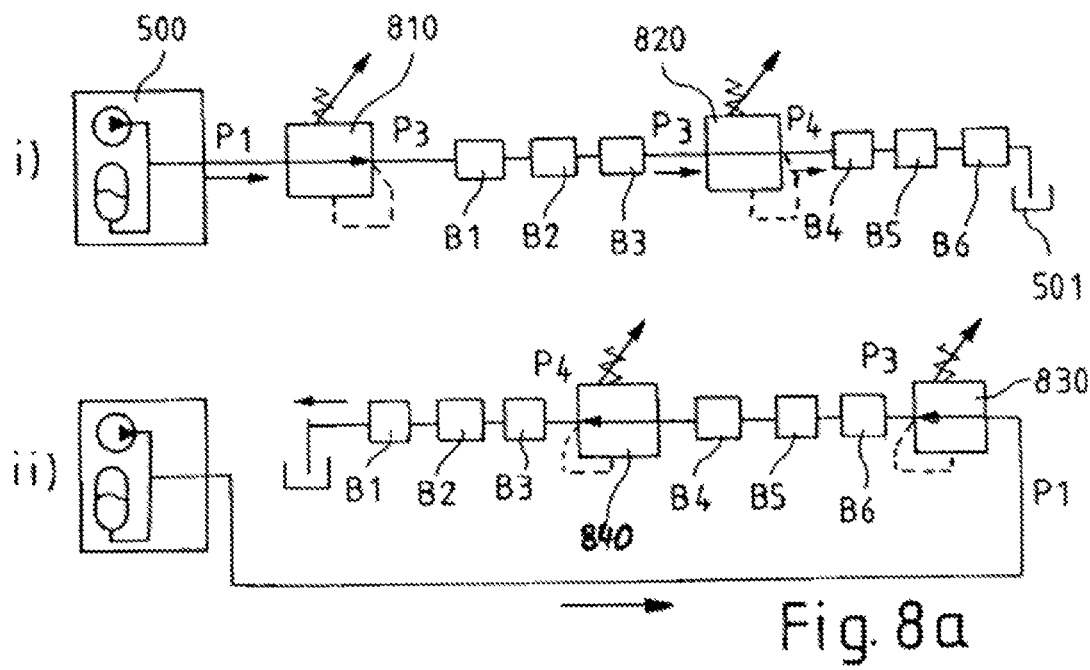
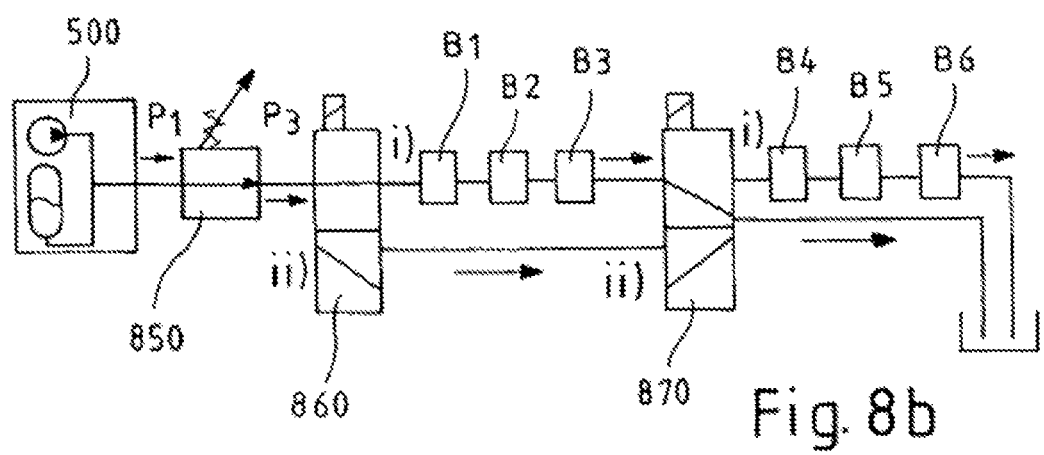

APPARATUS FOR ROTATING THE NACELLE OF A WIND TURBINE

The present invention relates to an apparatus for rotating the nacelle of a wind turbine.

Wind turbines produce electrical energy from the flow energy of the wind. The most common design of wind turbines involves installations that have a substantially horizontally arranged rotor shaft which is connected to a rotor provided with two or three rotor blades. The rotation movement of the rotor is converted into electrical energy via the rotor shaft and optionally additional drive train components with the utilization of a generator. The components of the drive train and the electrical components are arranged in a nacelle which is carried by a tower. The nacelle is here mounted rotatably on the tower, so that the rotor can be made to track the wind when there are changes in wind directions, by twisting the nacelle with respect to the tower. For the tracking movement, active systems are used predominantly, which have several motors that are controlled by means of a wind measurement system, for example, a wind vane attached to the nacelle, and by means of the wind direction determined by said system. These azimuth motors are hydraulic or electrical motors.

The purpose of the wind direction tracking of the nacelle is to achieve an optimal alignment of the rotor with respect to the wind. However, the wind direction tracking must not react excessively sensitively, because this would permanently result in small tracking movements. The lifespan of the mechanical components would be clearly reduced. Therefore, as a rule, the operation is carried out using time-averaged values in the determination of the wind direction, and tracking is triggered only if a certain angular difference between the actual position and the optimal position with respect to the wind is detected. This difference angle is referred to as the yaw angle.

A wind direction tracking system comprises several different components, such as, for example, a nacelle mount, one or more azimuth motors for the rotation of the nacelle, one or more brakes, usually hydraulic, optionally a locking device, as well as an electronic control system. These different components, depending on the design, are arranged either on or in the nacelle, or on or in the tower.

The nacelle mounting usually occurs by means of a roller bearing ("ball bearing") which is arranged between a geared bearing race fixed to the tower and a bearing race on the base plate of the machine housing. Moreover, as a rule, several drive motors with reduction gear are mounted stationarily on the machine housing, each engaging via a drive shaft pinion with the gear teeth of the bearing race fixed to the tower.

During the operation of a wind turbine, particularly in the case of turbulent winds, very high forces can occur, depending on the yaw angle of the rotor, and thus very high turning moments can occur, the so-called yaw moments. These high yaw moments can occur both during a tracking movement of the nacelle and also during standstill of the nacelle, so that the nacelle can be held in a twist-proof manner against said moments. In order to prevent the yaw moments from being held by the azimuth motors, a rotation restriction or a yaw brake is provided as a rule. Otherwise it would be difficult to ensure a sufficient lifespan of the motors or of the intercalated gear mechanisms. Small installations usually make do with a rotation restriction in the nacelle mount; for larger installations several releasable hydraulic yaw brakes are provided as a rule. Usually they engage on a brake race on the inner side of the tower or conversely on a ring on the nacelle. Electrical yaw brakes are also known. During the tracking movement as well, usually one or two of the yaw brakes are in brake engagement, in order to ensure the desired damping of the adjustment dynamics. The azimuth motors have to be designed in such a manner that these braking moments can be overcome by the yaw brakes (see, for example, Hau, "Windkraftanlagen [Wind turbines]," 4th edition, pages 349/350, Haltebremsen [Holding Brake] section).

It is also known to provide, in addition to the standstill holding brakes, separate brakes for the tracking movement, against which the azimuth motors have to work. The standstill holding brakes are only active when the nacelle is stopped during standstill, and they are released for the tracking movement (see Gasch/Twele, "Windkraftanlagen," 6th edition, pages 93/94, section 3.3.1. Windrichtungsnachführung [Wind Direction Tracking]). It is considered disadvantageous that additional tracking brakes have to be provided in addition to the standstill holding brakes.

It is also known to operate all the yaw brakes that work during standstill with a certain standstill holding moment, with the same and constant lower holding moment during the tracking. During the tracking movement, these known azimuth brake systems tend to produce undesired squeaking noises that are in part highly disruptive.

From DE 10 2008 004 948 A1, a brake system is known, in which the holding moment is controlled dynamically during the tracking movement. For this purpose, various alternatives are proposed:

the upstream or downstream connection of a controllable hydraulic valve in the hydraulic line to the brake or to the brakes and subsequent control of the oil flow through the hydraulic valves;

a "digital" control by opening or closing of hydraulic valves connected in parallel to the brakes; and the individual actuation of the brakes by hydraulic valves connected downstream or upstream, wherein the brakes are operated at maximum braking pressure, and brakes are compressed or released in a targeted manner.

Finally, in the state of the art, the following modifications on the brake lining or on the brake disk are known, for the purpose of reducing disruptive noises: a targeted roughening of the brake disk; the use of different brake lining types; regular cleaning of the brake linings and brake disk, partially automated; variation in the thickness of the brake linings and supports; introduction of boring or milling patterns into the brake disk; introduction of marginal bevels or groove systems in the brake lining. If such improvements are reproducibly successful at all, they in part also result in an increased brake wear, they last only briefly, disappearing again after several braking processes, and they are achieved at incommensurably high expense.

The problem of the invention is to produce, on the basis of the mentioned prior art, an improved apparatus for the rotation of the nacelle of a wind turbine, which generates a constant holding moment during the tracking movement and which reduces the occurrence of disruptive squeaking noises. It should preferably be possible to retrofit existing devices without large expense to a device according to the invention.

The problem is solved by a device for a wind turbine with the characteristics of Claim 1. Additional advantageous embodiments of the invention are indicated in the dependent claims.

The term yaw brakes used in the claims should here not cover separate brakes used exclusively during the tracking movement, nor brakes used exclusively during the standstill. According to the claim, the only brakes concerned are those that contribute at least temporarily both to the holding moment during the tracking movement and also to the holding moment during the standstill. However, the invention does not exclude the use of additional brakes in addition to the brakes according to the claims.

The invention is based on the finding that disruptive noises of the azimuth brake system are avoidable during tracking, if the individual braking force of a yaw brake remains below a certain first value or above a certain second limit value. In this intermediate range, between this first and second value, on the other hand, the so-called SLIP-STICK effect which is responsible for the development of noise occurs increasingly. In fact, the above-mentioned first and second values cannot be indicated precisely and in a generally valid manner, because, on the one hand, they are apparatus dependent, and on the other hand, disruptive noises do no abruptly stop occurring once a certain value has been reached. However, it has been found that an improvement occurs reliably if, for example, one half the yaw brakes are operated during the tracking movement with increased braking force and the other half with decreased braking force. "Increased" and "decreased" here should be understood relative to the braking force which would have to be imparted on average by all the yaw brakes, if all the brakes were used evenly to impart the tracking holding moment. A concrete example can illustrate this. Eighteen hydraulic azimuth brake calipers are arranged radially distributed around a brake disk, and they each must be acted upon with fifteen bar braking pressure for the generation of the holding moment required during the tracking movement. The noise generation can be enormously reduced as a result, if eight of these eighteen brake calipers are supplied with a braking pressure of thirty-four bar, that is to say above a second limit value which is above 15 bar and below 34 bar in the present example, while ten of the brake calipers remain without braking pressure, that is below a first limit value which in the present example is under 15 bar. The total holding moment remains substantially unchanged, and the noise level remained at a lower level for a 2-month test period.

The possibility of allocating the yaw brakes to more than two groups is covered by the claim, for example, the possibility of operating a first group at a first, a second group at a second, and a third group at a third pressure moment or braking moment level. In such a case, of the total number z of yaw brakes present in all, according to the claim, n brakes would be distributed over the two groups mentioned in Claim 1, while the remaining (z−n) yaw brakes would be distributed over other groups. The claim thus also covers the allocation of the z yaw brakes into more than two groups and also the setting of more than two pressure moment and braking moment levels.

Advantageously, according to Claim 2, the yaw brakes are actuated here in such a manner that, in a first tracking operation, a first partial number of the yaw brakes is used for the generation of the standstill braking moment, while in a later tracking operation, other brakes generate the tracking braking moment, which is maintained on the lower holding moment M4 during the first tracking operation. The result of this is that not only a portion of the yaw brakes is stressed in tracking operation, but the possibility is also provided of exposing all the yaw brakes to a relatively even loading. This is achieved in particular in that, according to Claim 3, an alternating control is chosen, and thus the yaw brakes are actuated alternately in tracking operation for the generation of the standstill holding moment, but then, in the next tracking operation, they generate only the lower holding moment M4.

According to Claim 4, it is preferable that the number of yaw brakes is divided into two approximately equal partial numbers, of which the first portion is actuated in the first tracking operation for the generation of the respective holding moment M3, while in a later tracking operation, the remaining yaw brakes are actuated for the generation of the holding moment M3. It is indeed also possible to use subdivisions such that, for example, all of the yaw brakes are divided into three or four subgroups. However, from the point of view of control logic and circuit technology, it is simpler to divide the number of the yaw brakes into two approximately equal partial groups. The subdivision into equal partial numbers is also advantageous because a constant tracking braking moment can be achieved in a reliable and simple manner in each tracking operation.

According to Claim 5, it is advantageous that the holding moment M4, i.e., the lower holding moment in tracking operation is approximately 0. This means that the corresponding yaw brakes in tracking operation contribute substantially no braking moment to the tracking braking moment. In the case of hydraulic brakes, this can be achieved, for example, in that, in regard to these yaw brakes, the return flow of the hydraulic fluid to the tank can occur largely without resistance. However, it is also possible that this return has to occur against a slight pressure. For example, if the braking pressure of the yaw brakes that generate the tracking braking moment M3 is 35 bar, then a pressure of less than 5 bar is considered low in the sense of this Claim 5.

Advantageously, the m brakes actuated for the generation of the tracking braking moment are here arranged symmetrically about the rotation axis of the nacelle, in order to achieve the most even possible distribution of moments. Moreover, it is advantageous that the remaining (n−m) yaw brakes are arranged in the same manner symmetrically about this axis. A point symmetrical arrangement would be particularly advantageous; however, a mirror symmetrical arrangement also has already considerable advantages in comparison to a one-sided arrangement of the yaw brakes, for example.

The yaw brakes according to the previous claims could be designed as desired. Besides hydraulically operating brakes, one can also consider using electrical brakes, for example. It is also conceivable that the brakes are integrated in the actuating drives, as is known in electrical actuating drives with integrated brake function, for example. The fundamental teaching of Claims 1-6 can be applied to all these brakes.

In the case of hydraulic brakes with hydraulic supply and hydraulic actuation, it is advantageous, according to Claim 7, that the control device controls the actuating elements arranged in the hydraulic supply circuit in a certain manner, namely such that, in standstill operation, all the yaw brakes are supplied with an operating pressure P1 which leads to the generation of the overall standstill holding moment M1. For the tracking operation, the actuating elements of the control device are actuated, in order to discontinue the standstill operation and in order to supply m yaw brakes with a tracking operating pressure P3 which is lower compared to the standstill operating pressure, and the remaining (n−m) yaw brakes with an even more reduced operating pressure P4. Here, the term actuating elements covers multi-way valves, flow control valves or locking valves and pressure valves, among others, which are also combined and connected to each other at appropriate sites in the hydraulic supply circuit, in order to adjust the pressure conditions required according to the claims.

The arrangement of the actuating elements and the piping of the hydraulic supply circuits can occur in multiple ways. For example, in principle, it is conceivable that each hydraulic brake is supplied with pressure in a separate hydraulic supply circuit. By means of appropriate pressure reducing or pressure limiting valves, arranged in such a manner that they can be connected or switched off, it would be possible, for example, to switch back and forth between the standstill operating pressure P1 and the tracking operating pressure P3. The reduced tracking operating pressure P4 could continue to be set, for example, by having the yaw brakes cut off from the pressure supply, and thus having them operate without pressure moment and braking moment.

However, according to Claim 8 it is advantageous to arrange the yaw brakes in two separate hydraulic circuits controlled by actuating elements. In a first hydraulic circuit, the m yaw brakes which exert the holding moment M3 in tracking operation are series connected, while in the second separate hydraulic circuit, the (n−m) yaw brakes which generate the lower tracking moment M4 are series connected. This piping variant has the advantage that simple control logic is used, and a simple control can occur.

Alternatively to the above-mentioned arrangement of the yaw brakes, it is advantageous, according to Claim 9, to series connect the n yaw brakes in a double ring line wherein each ring line is controlled by an actuating element. This has the advantage that no changes at all need to be made in the hydraulic unit, wherein the term hydraulic unit denotes a hydraulic pump and/or a pressure reservoir. The implementation of this double ring arrangement can occur, for example, via the logic circuitry of two magnet valves, wherein, in comparison to the control in the prior art, a logic valve control needs to be implemented furthermore on the software side.

The advantageous characteristics of Claim 10 lead to a simple capacity for retrofitting, because only the additional uncontrolled actuating elements need to be built in. An additional connection of these actuating elements to the control and their functional extension would not be necessary.

In the prior art, the yaw brakes that are actuated for the generation of this standstill holding moment are as a rule series connected in a hydraulic circuit. Here it is advantageous, according to Claim 11, with a view to a simple capacity for retrofitting, that an actuating element consisting of a pressure limiting valve and a nonreturn valve parallel connected to the former valve is arranged between the $m^{th}$ and the $(m+1)^{th}$ yaw brake. The arrangement here occurs in such a manner that the locking direction of the nonreturn valve corresponds to the open direction of the limiting valve. The hydraulic circuit is moreover designed in such a manner with actuating elements and lines that, in the case of an appropriate control of the actuating elements by the control device, in standstill operation, the standstill operating pressure P1 is applied to all n yaw brakes, by bypassing the pressure limiting valve, and the flow direction in the hydraulic circuit corresponds to the passage direction of the nonreturn valve. In tracking operation, the control device controls the required actuating elements in such a manner that the required operating pressure P3 is applied on the m yaw brakes, up to the pressure limiting valve, for the generation of the tracking braking moment, and the flow direction in the hydraulic circuit corresponds to the locking direction of the nonreturn valve. The level of the braking pressures P3 and P4 is here set in such a manner that m*M3+(n−m)*M4 corresponds approximately to M1. To implement these characteristics, only a minor installation measure is required in order to modify the hydraulic piping and optionally to incorporate additional actuating elements, namely the combination of the pressure limiting valve with the parallel connected nonreturn valve has to be built in. However, no operation needs to be undertaken in the hydraulic unit. Depending on the starting hydraulic circuit, a minor intervention or no intervention in the control is required.

In addition to the hydraulic unit, which takes over the pressure supply in standstill operation, a pressure reservoir is advantageously provided here according to Claim 12, which takes over the pressure supply in tracking operation. The pressure reservoir for this purpose is arranged in the hydraulic circuit in such a manner that its pressure input point is located in the flow direction of the tracking operation before the pressure limiting valve. Up to the pressure limiting valve, a certain pressure predetermined by the limiting valve is applied to the m yaw brakes, while behind the pressure limiting valve, another pressure is applied, for example, the pressure for the return flow of the hydraulic fluid into the tank. If no leaks occur on the actuating elements used, a pressure reservoir is in fact not needed, since the pressure can also be maintained reliably in the system without pressure reservoir. However, over longer time periods, a constant pressure can be achieved better with a pressure reservoir.

Below, the invention is explained in further detail in reference to diagrammatic embodiments represented in a simplified manner.

Figure 6A:
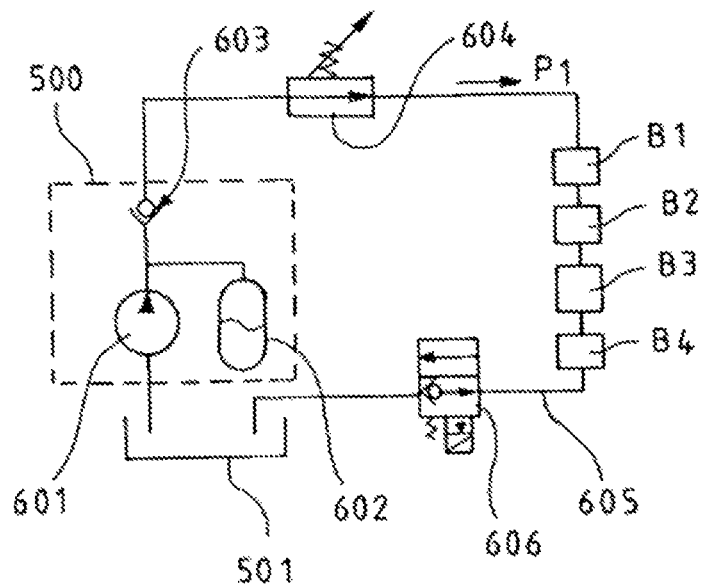
Figure 7A:
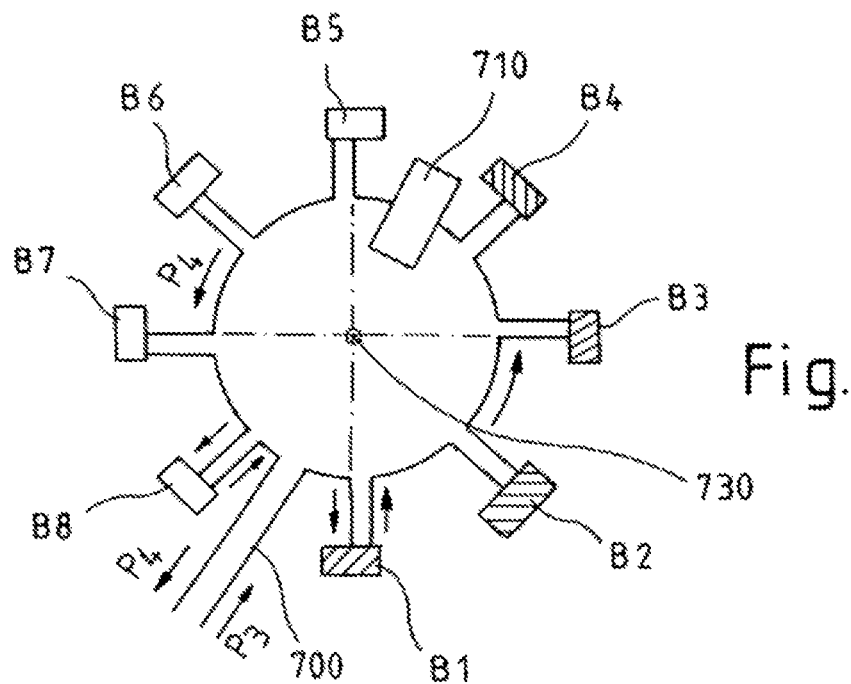

FIGS. 6a, b show a basic representation of the hydraulic control of series connected yaw brakes according to the prior art (a) and according to the invention (b);

FIGS. 7a,b,c,d show several basic representations of various embodiment examples of the hydraulic actuation of series and/or parallel connected yaw brakes; and FIGS. 8 a, b show several basic representations of logical actuating element arrangements.

Figure 1:
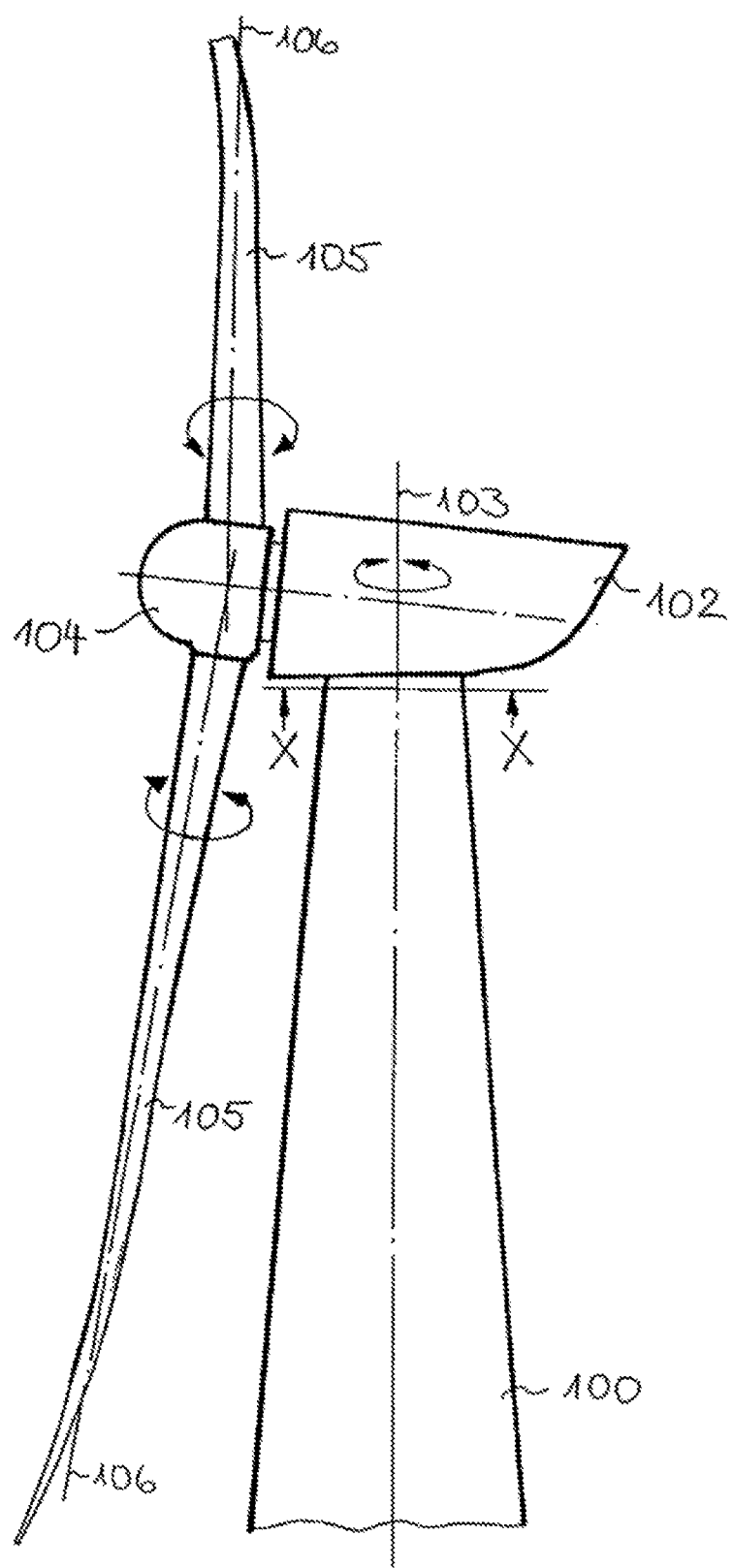
FIG. 1 shows a wind turbine in a side view.

FIG. 1 shows a wind turbine with a tower section 100 on which a nacelle 102 is rotatably mounted. The nacelle 102 can be rotated about the longitudinal axis 103 of the tower, in order to be able to have the rotor 104, 105, which is rotatably mounted on said axis, track the wind in the case of changing wind direction. The rotor consists of a rotor hub 104 on which several rotor blades 105 are arranged, which as a rule are each designed to be rotatable about their longitudinal axis 106.

Figure 2:
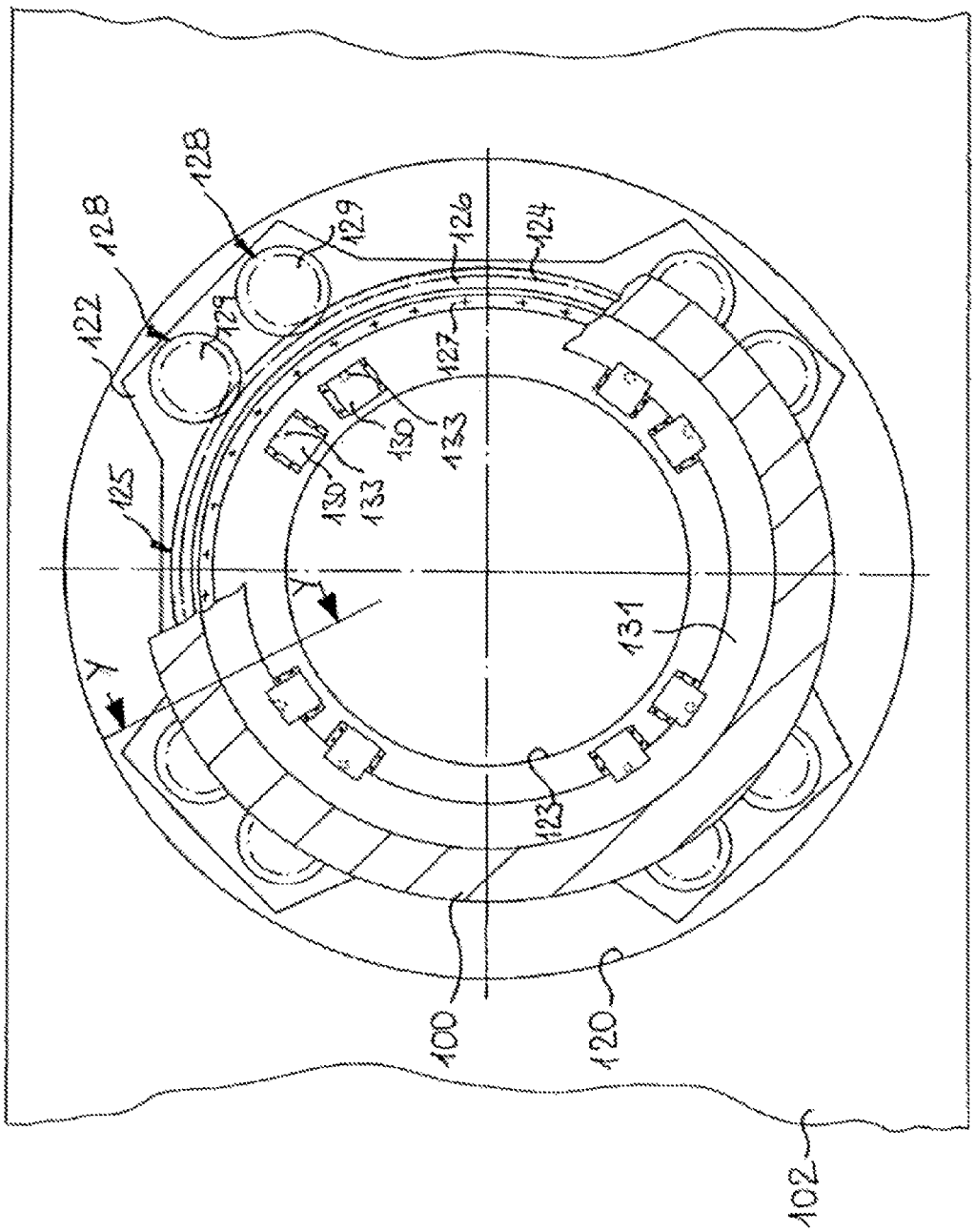
FIG. 2 shows a cross section along the line X-X represented in FIG. 1

In FIG. 2, a cross section through the tower 100 along the line X-X shown in FIG. 1 is represented. FIG. 2 also shows the nacelle 102 in a view from below, wherein the front and the rear area of the nacelle are not represented, for the sake of simplicity. The nacelle 102 has a nacelle opening 120 for the connection to the tower 100. For reasons pertaining to the representation, the tower 100 in the cross section is shown with partial cutaway in the upper right quadrant, to be able to better show the swivel connection between the tower and the nacelle. The swivel connection of the nacelle 102 to the tower 100 occurs via an azimuth bearing 125. The azimuth bearing consists of an outer ring 126 and an inner ring 127. The outer ring 126 is attached to the tower 100, and it has an outer gearing 124, which is represented in FIG. 2 by a dot-dashed line. The inner ring 127 is connected to a machine support 122 arranged in the nacelle 102, and is thus connected to the nacelle. To allow access from the tower to the machine support 122, an access opening 123 is provided in the machine support.

Figure 3:
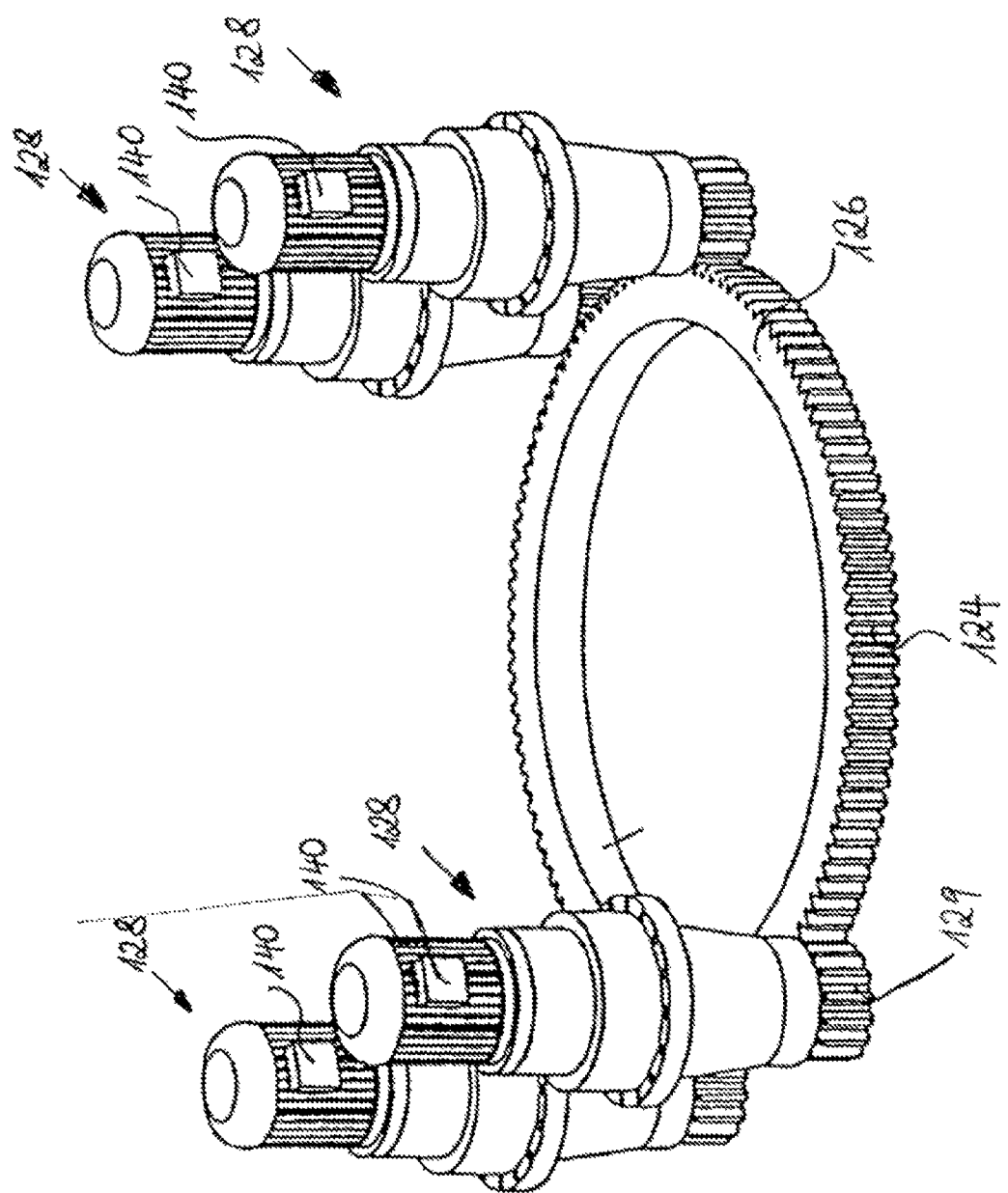
FIG. 3 shows a bearing ring with azimuth motors engaging on it.
Figure 4:
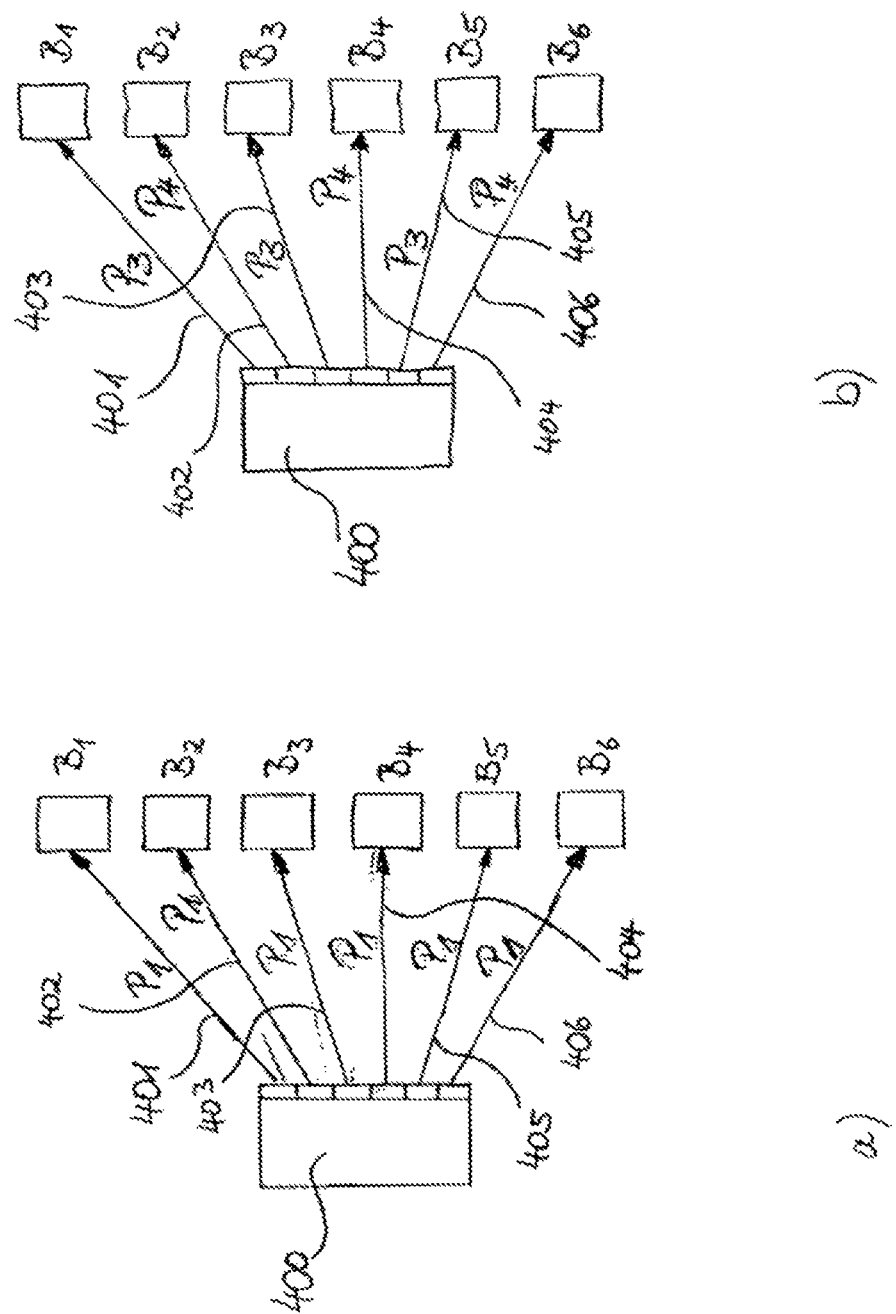
FIG. 4 shows a basic representation of yaw brakes which can be individually actuated and controlled by a control device.

FIG. 2 shows an embodiment example of the design of a rotation apparatus for the nacelle 102. For the active rotation of the nacelle relative to the tower, motor drives are needed. For this purpose, eight actuating drives 128 are provided, wherein in each case two actuating drives 128 are arranged as a pair, and offset in each case by 90° relative to the other pairs of actuating drives. The actuating drives 128 are held by the machine support 122. Moreover, each actuating drive 128 has a cogged pinion 129 which is engaged with the outer gearing of the outer ring 126 of the azimuth bearing 125. FIG. 3 shows this interaction between the cogged pinions 129 of the actuating drives 128 and the outer gearing 124 of the outer ring 126.

The alignment of the nacelle 102 occurs via an actuation of the control 140 of the actuating drives 128 by means of a control device that is not shown. To maintain an alignment of the nacelle 102 which is set via the control device, eight brake devices 130 are provided in the represented embodiment example of FIG. 2. Each brake device 130 is arranged in the area of an actuating drive 128, wherein the brake devices 130 are each firmly connected to the machine support 122. Each one of the diagrammatically represented brake devices 130 has two brake shoes which are not visible in this representation, and which, during an actuation of the brake device, enter into a frictional connection with a brake disk 131 extending between the two brake shoes. The brake disk 131 is arranged firmly between the tower 100 and the outer ring 126 of the azimuth bearing 125. Such brake devices 130 are described, for example, in Gasch/Twele, "Windkraftanlagen," 6th edition, Chapter 3.3, for example, FIGS. 3-46 and 3-47 as well as Hau, "Windkraftanlagen," 4th edition, Chapter 8.13, for example, FIGS. 8.60 and 8.64.

In FIGS. 4a) and 4b), for the case of an individual actuation of the yaw brakes B 1-B 6, the actuation situation is represented for the standstill operation (a), on the one hand, and for the tracking operation (b), on the other hand. In standstill operation, the control device 400 applies control signals 401-406 to each one of the yaw brakes B1 -B 6. In the case where B 1-B 6 are hydraulic brakes, each of these control signals can be, for example, a standstill operating pressure P1 which is required for the generation of the overall standstill holding moment M1. In the case of electrical brakes with spindle drives, the control signal 401 can be, for example, information regarding the number of the spindle rotations.

In contrast, the control device, in the tracking operation represented in Figure b), applies the control commands 401, 403, 405, which control the mentioned yaw brakes in each case to a tracking braking moment M3, to a first group of yaw brakes consisting of the brakes B1, B3, B5. In hydraulic brakes it is possible, for example, to apply a tracking operation pressure P3 to the brakes B1, B3 and B5. In contrast, the yaw brakes B2, B4 and B6 are actuated by the control device 400 with control signals 402, 404, 406 in such a manner that the mentioned brakes generate a tracking braking moment M4 in each case. In the case of hydraulically working yaw brakes, the control device can apply, for example, an operating pressure P4 to the brakes B2, B4 and B6, in order to generate the respective braking moment M4.

Figure 5:
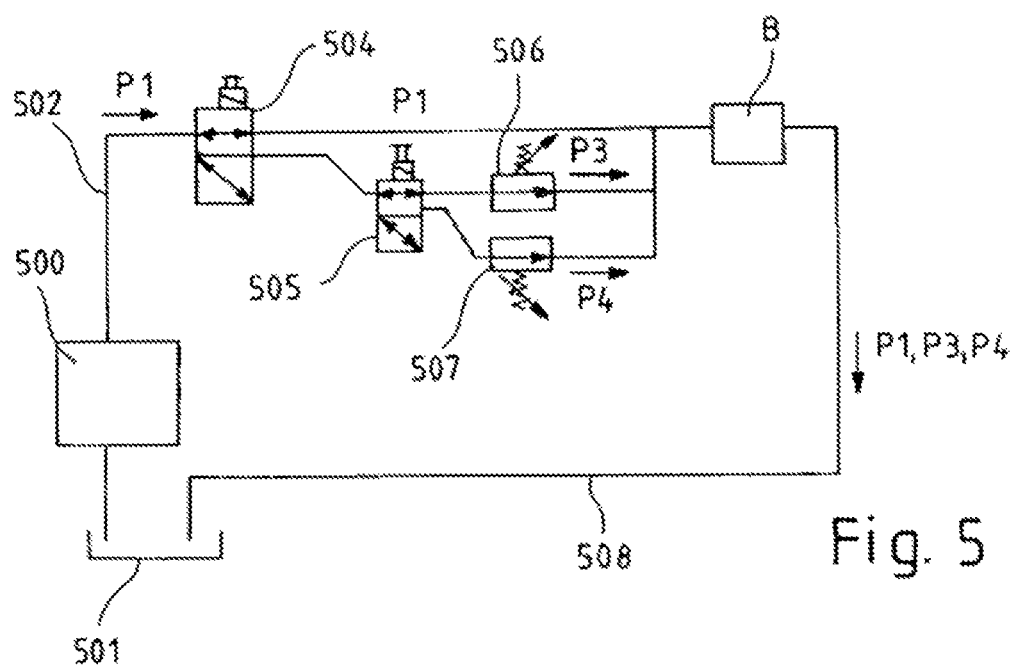
FIG. 5 shows a basic representation for the hydraulic control of parallel connected yaw brakes.

FIG. 5 shows a basic representation of a hydraulic supply circuit for an azimuth brake B. In reference to FIG. 4b), each one of the azimuth brakes B1-B6 shown there could be arranged in such a hydraulic circuit. Thus, FIG. 5 shows the arrangement of each azimuth brake in a separate hydraulic circuit.

The hydraulic unit 500 pumps the hydraulic fluid from a tank 501, and it applies a hydraulic pressure P1 to the hydraulic line 502. A switchable two-way valve 504, in the represented first switch position, allows the passage of the pressure P1, so that an operating pressure P1 is applied to the downstream yaw brake B for the generation of the standstill holding moment M1, or of a portion of the standstill holding moment M1, which is applied as a rule jointly by several yaw brakes.

In the second switch position of the two-way valve 504, the operating pressure P1 is applied to a second two-way valve 505. In the first represented switch position of this two-way valve, the operating pressure P1 is allowed to pass through to a pressure reducing valve 506, so that an operating pressure P3 is applied behind the pressure reducing valve. In the represented switch position of the two-way valve 505, the yaw brake B would be acted upon, in the second switch position of the two-way valve 504, by the operating pressure P3 for the generation of the tracking holding moment M3. For the generation of the tracking holding moment M4, the two-way valve 504 has to be brought into the second switch position, and at the same time the two-way valve 505 also has to be brought into the second switch position. In these switch positions, the operating pressure P1 is applied to the pressure reducing valve 507, behind which an effective operating pressure P4 is then applied.

It is understood that, in order to implement this fundamental control structure, further actuating elements that are not represented are required, for example, in the line region 508 which leads back to the tank, in order to be able to build up the respective operating pressure P1, P3 or P4 at the yaw brake B.

The piping and the logic circuitry represented in FIG. 5 could be very expensive for the practical implementation. The embodiment examples represented in the following figures in contrast are characterized by a simpler piping and control logic.

FIG. 6a) shows a conventional hydraulic supply arrangement according to the prior art, in a simplified representation. The hydraulic unit 500 in the depicted example consists of a pump 601, a pressure reservoir 602 as well as a nonreturn valve 603. A pressure reducing valve 604 arranged downstream controls the outlet pressure to a desired operating pressure P1. The series arranged yaw brakes B1-B4 all experience the same operating pressure P1 and together they generate the standstill holding moment M1, wherein each brake substantially supplies the same contribution 1/4 M1. In the return line which is connected to the yaw brake B4, a switchable actuating element 606 is arranged. In the represented switch position of this actuating element 606, the return flow of the hydraulic fluid into the tank 501 is prevented, while in the second switch position the return flow is opened to achieve pumping in the circuit. This can also occur against a low pressure. In the represented switch position of the actuating element 606, the operating pressure P1 is applied to the azimuth brakes B1-B4, while in the second switch position either no operating pressure is applied, or the pressure that is applied is the one against which the return flow into the tank occurs.

Figure 6B:
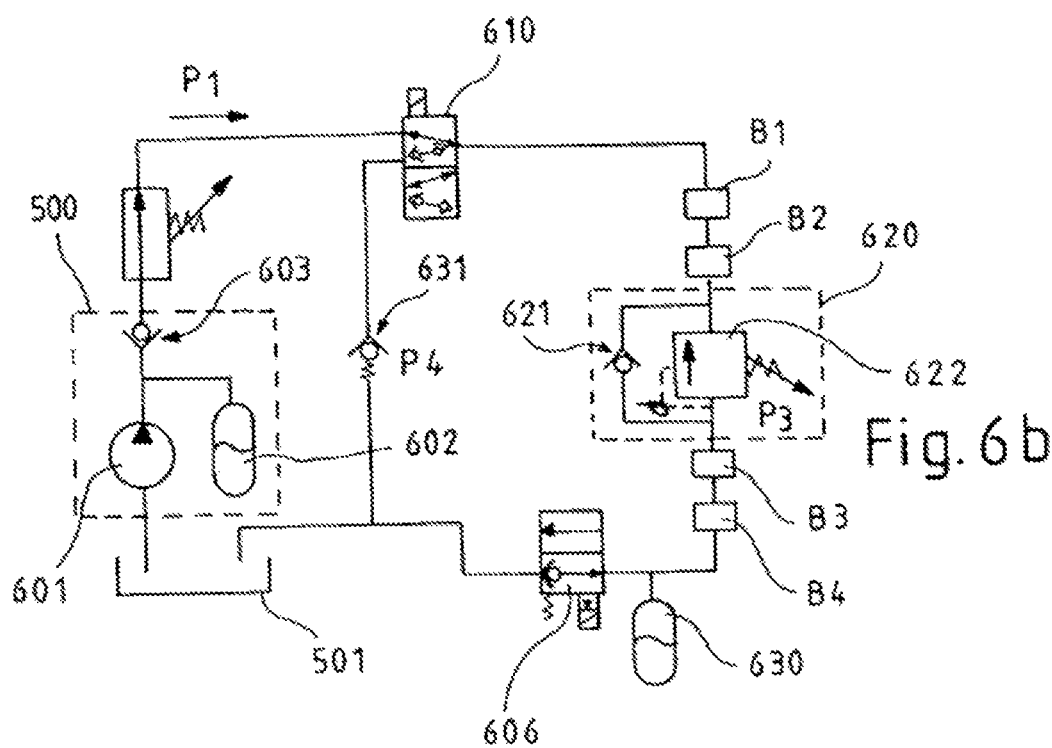

FIG. 6b) contains the following modifications compared to the construction of FIG. 6a) which corresponds to the prior art. In front of the serially arranged yaw brakes B1-B4, a two-way valve 610 is arranged, which can be switched to a first and to a second switch state by the control device which is not shown. In the represented first switch position, the operating pressure P1 is allowed to pass through without impediment, and the operating pressure P1 is applied thus to the yaw brakes B1-B4. Between the yaw brakes B2 and B3, an actuating element 620 is arranged, which consists of a nonreturn valve 621 and a pressure limiting valve 622 which is parallel connected to said nonreturn valve. The pressure limiting valve opens at a pressure P3.

In the shown switch position of the actuating element 610, the operating pressure P1 is applied to the yaw brakes B1 and B2. The nonreturn valve 621 is exposed to flow in the passage direction and it opens, so that the operating pressure P1 is also applied to the yaw brakes B3 and B4. The pressure limiting valve 622, on the other hand, is exposed to flow in a direction opposite its passage direction, and it is bypassed by the nonreturn valve 621.

For the tracking operation, the actuating element 610 is actuated to the second switch position of the control device which is not shown. The hydraulic unit 500 is thus uncoupled from the line system that supplies the yaw brakes B1-B4. An additional pressure reservoir 630, which is optionally provided in order to compensate for any leaks and pressure loss, now provides the required operating pressure. In the represented switch position of the actuating element 606, the hydraulic fluid cannot flow directly in the direction of the tank, viewed from the pressure reservoir 630; instead, it must flow in the direction of the yaw brake B4. Thus, in comparison to the above-described situation, the direction of flow has changed. The direction of flow thus now leads in the locking direction of the nonreturn valve 621, while the pressure limiting valve 622 is acted upon in the passage direction. This pressure limiting valve is designed to open at a pressure of P3, so that an operating pressure P3 is applied to the yaw brakes B4 and B3 which are arranged before in the direction of flow, provided the design of the pressure reservoir 630 is sufficient to provide this pressure. After the flow through the pressure limiting valve 622, there is flow through the yaw brakes B2 and B1. The hydraulic fluid then flows through the actuating element 610 which is to the second switch position, and then, after overcoming the spring-loaded nonreturn valve 631, it flows back into the tank 501. The spring-loaded nonreturn valve 631 opens at a pressure P4, so that an operating pressure P4 is applied to the yaw brakes B2 and B1, for the generation of a tracking holding moment M4. The yaw brakes B4 and B3 each generate a tracking holding moment M3.

In FIGS. 7a)-7d), additional hydraulic configurations for carrying out the invention are represented in a simplified basic representation. FIG. 7a) shows the series arrangement of the yaw brakes B1-B8 in a ring line 700, which is supplied with operating pressure by a hydraulic unit that is not represented. The tracking operation is represented so that the applied operating pressure corresponds to the pressure P3. Between the yaw brakes B4 and B5, an actuating element 710 is arranged. The yaw brakes B1-B4 which are arranged in the direction of flow before said actuating element 710 are all exposed to the operating pressure P3, and they each generate a tracking holding moment M3. Thus, the actuating element 710 is, among other possibilities, a pressure reducing valve which reduces the operating pressure from the pressure P3 to an operating pressure P4. The yaw brakes B5-B8 which are arranged downstream in the direction of flow after the actuating element 710 are therefore exposed to an operating pressure P4, and they thus each generate a tracking holding moment M4. It is not shown that, behind the yaw brake B8, an additional actuating element (for example, a 2/2 way valve) is connected downstream, so that the pressure P1 can be applied to all the brakes. In addition, a ventilation of the pressure line between the actuating element 710 and the actuating element behind the yaw brake B8 should be ensured. Finally, it should be pointed out that the actuating element 710, in standstill operation, must allow the passage of the standstill operating pressure P1, for example, because the actuating element 710 comprises a switchable 2/2 way valve. The representations shown here must in any case be understood only as to be an illustration of the principle according to the invention. In principle, it is clear to the person skilled in the art who carries out this teaching that possibly additional lines, valves or actuating elements known from the prior art have to be provided.

Figure 7B:
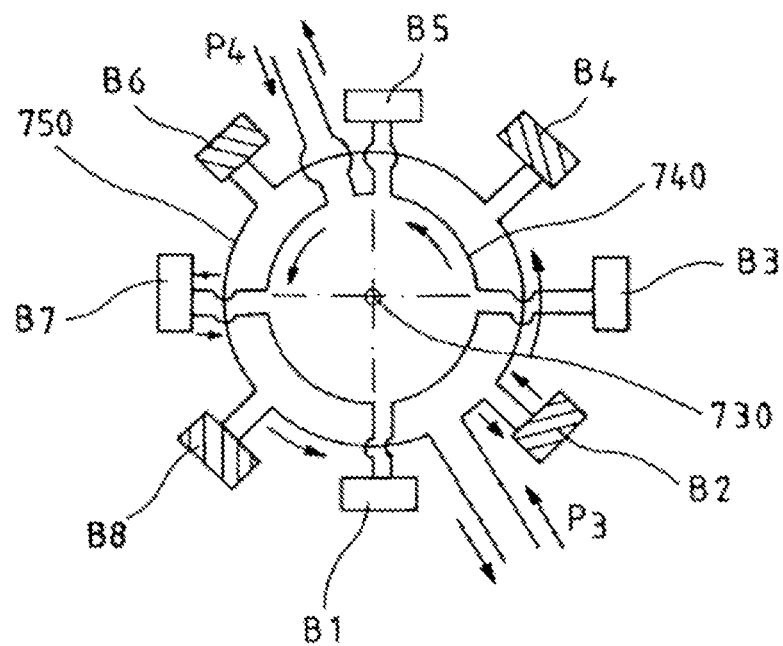

FIG. 7b) shows an alternative configuration of FIG. 7a). In this embodiment example, the yaw brakes B1 -B8 are arranged in two separate hydraulic circuits. Arranged in each case in a point symmetrical arrangement relative to the rotation axis 730, the yaw brakes B1, B3, B5 and B7 are serially connected by pipes in the first hydraulic circuit 740, while the yaw brakes B2, B4, B6 and B8, which are also in an arrangement with point symmetry about the rotation axis 730, are connected by pipes in the second hydraulic circuit 750. An operating pressure P3 or P4 is applied to the two hydraulic circuits. Since a tracking operating pressure P3 is applied to the hydraulic circuit 750 in the depicted example, the yaw brakes B2, B4, B6 and B8 each generate a tracking holding moment M3, while the remaining yaw brakes B1, B3, B5 and B7 each generate a tracking holding moment M4, since they are acted upon by an operating pressure P4.

Figure 7C:
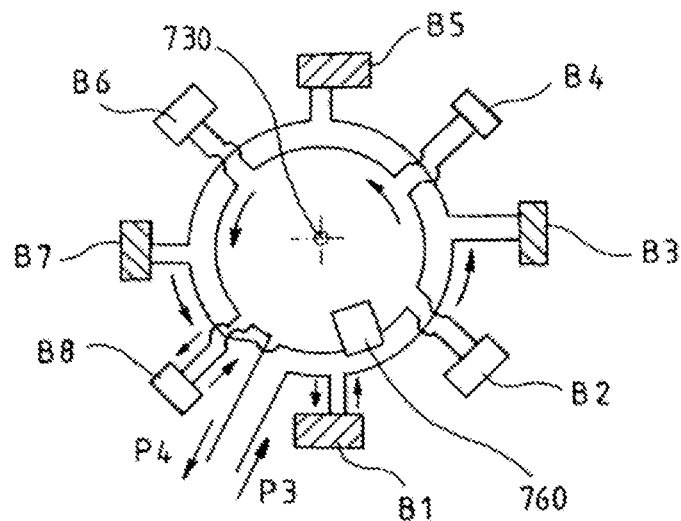

FIG. 7c) shows a serial arrangement of the yaw brakes B1-B8, wherein, in this example, a double peripheral ring is provided, and the yaw brakes are connected in this double circuit in the sequence B1, B3, B5, B7, B2, B4, B6, B8. Between the yaw brake B7 and the yaw brake B2, an actuating element 760 is arranged. An operating pressure P3 is applied to the inlet side of the hydraulic circuit. The actuating element 760 is a pressure limiting valve which opens at an operating pressure of P3. The pressure behind this pressure limiting valve is determined by the pressure at which the hydraulic fluid flows back into the tank, for example, through a spring-loaded nonreturn valve which opens at an operating pressure P4. Therefore, the operating pressure P3 is applied to the yaw brakes B1, B3, B5 and B7, because they are arranged in the direction of flow before the pressure limiting valve 760, while the lower operating pressure P4 is applied to the yaw brakes B2, B4, B6 and B8. As also in the embodiment example of FIG. 7b), the yaw brakes B1, B3, B5 and B7 as well as the yaw brakes B2, B4, B6 and B8 are arranged symmetrically about the rotation axis 730. The statement on FIG. 7a) in reference to an actuating element that is to be arranged behind a yaw brake B8 for the generation of the standstill holding moment applies similarly here, as does the statement regarding the ventilation and regarding the actuating element 710 in standstill operation.

Figure 7D:
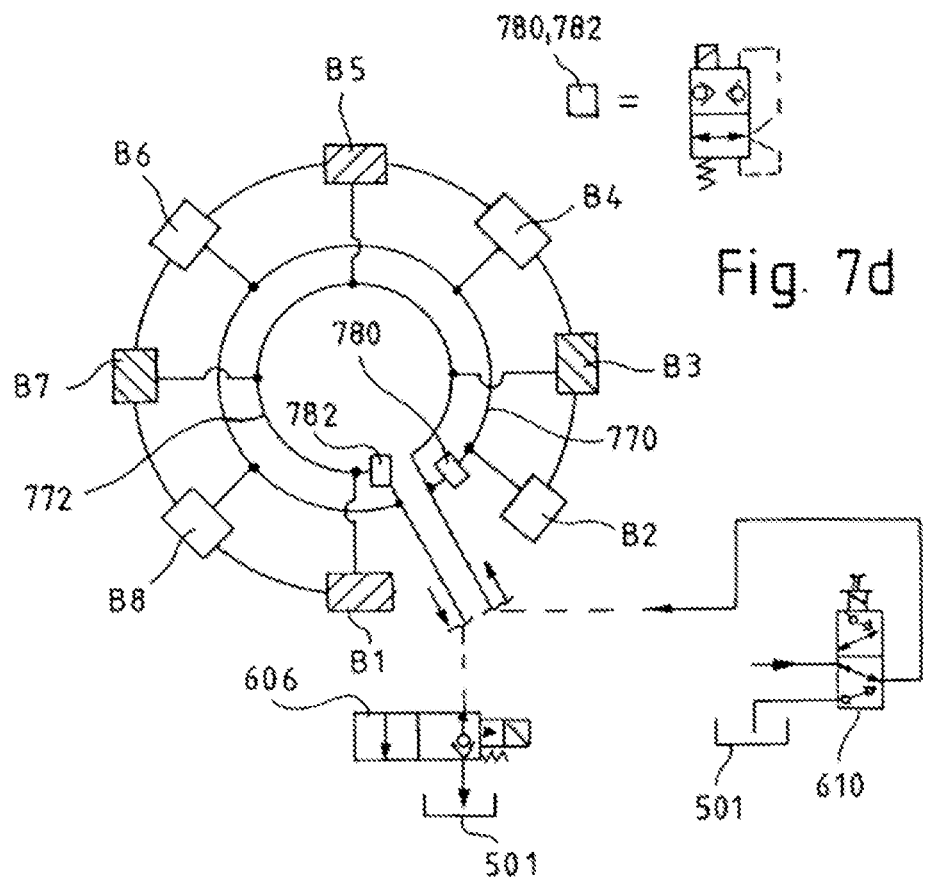

FIG. 7d) shows an additional embodiment example of the invention in which, on the inlet side, an actuating element 610 as known from FIG. 6b), and, on the outlet side, an actuating element 606, as also known from FIG. 6b), are arranged. A first supply ring line 770 is controlled on the inlet side by an actuating element 780, and a second supply line 772 is controlled on the outlet side by an actuating element 782. The actuating elements 780 and 782 are magnetic valves of identical design which close when energized and which are open when not energized. The yaw brakes B2, B4, B6 and B8 are connected to the first supply line 770, and the yaw brakes B1, B3, B5 and B7 are connected to the second supply line 772. Depending on the switch state of the various actuating elements, the following functions can be implemented.

In order to rinse the hydraulic circuit, the two-way valve 610 is brought into the first, that is to say the opened state. The magnetic valves 780 and 782 remain unenergized, and thus open. Finally, the rinsing valve 606 also has to be opened, wherein, in the represented configuration, energizing is required for that purpose, in order to bring the valve into the opened switch position. The hydraulic fluid can now be pumped at zero pressure in the circuit.

To untwist, all the yaw brakes are switched to zero pressure. For this purpose, the two-way valve 610 is energized, so that it transitions into the closed state. As in the preceding rinsing, the magnetic valves 780 and 782 are not energized and they remain in the open switch state. The rinsing valve 606 also must be brought into the open switch state, and for that purpose it is energized. Thus there is no operating pressure in the azimuth circuit, so that none of the yaw brakes exerts a holding moment.

For standstill operation, the pressure applied to all the yaw brakes should be 160 bar. For this purpose, the two-way valve 610 is brought into the opened switch position by absence of energizing. The operating pressure P1 produced by the hydraulic unit is allowed to pass through as already explained in reference to FIGS. 6a) and 6b). The magnetic valves 780 and 782 should allow this pressure P1 to pass through, and therefore they are not energized. Finally, for the pressure buildup, it is also necessary that the rinsing valve 606 is closed. This is achieved by also not energizing this valve. The standstill pressure P1 is then applied in the entire azimuth circuit and thus on all the azimuth brakes B1-B8, for the generation of the overall holding moment M1.

In tracking operation, which always occurs after a standstill operation, the standstill pressure of 160 bar that is still applied in the system has to be changed. The yaw brakes B2, B4, B6 and B8 should be operated essentially at zero pressure, and the remaining yaw brakes at 34 bar, for example. For this purpose, the magnetic valves 780 and 782 are first energized, and as a result both are closed. Subsequently, the inlet-side two-way valve 610 is energized, and is thus closed toward the pressure supply. No connection exists any longer with the hydraulic unit. At the same time, the two-way valve 610, in this switch position, is open toward a pressure limiting valve which is not represented, and which is connected downstream of the outlet of the valve 610 which is in the second switch position. This pressure limiting valve can be designed, for example, as marked with the reference numeral 620 or 622 in FIG. 6b). Using this pressure limiting valve, the pressure is lowered to the desired tracking pressure P3, for example, to 34 bar. The rinsing valve 606 is energized and thus opened, as a result of which the pressure is released from the first supply line 770. The magnetic valve 782 is closed, i.e., the outflow into the tank 501 is prevented; the pressure in the second supply line 772 thus is 34 bar. The magnetic valve 780 is also closed, i.e., the intake of pressure into the first supply line 770 is prevented. Since the outlet-side opposite side is open through the rinsing valve 606 to the tank 501, the pressure applied to the first supply line 770 is approximately 0 bar.

FIGS. 8a) and 8b) show a basic diagrammatic view of the circuit arrangements for the alternating application of a first and a second operating pressure, respectively, to the first and the second groups of yaw brakes. FIG. 8a), in the subfigure i), shows a hydraulic unit 500 which applies an operating pressure P1 to a first actuating element 810. This actuating element is a pressure reducing valve which regulates the applied pressure P1 down to an operating pressure P3. The yaw brakes B1-B3 which are arranged downstream of the actuating element 810 are exposed to the operating pressure P3, and they each generate the tracking holding moment M3. A second actuating element 820 is arranged after the yaw brake B3; it too is a pressure reducing valve which reduces the applied operating pressure P3 to a lower operating pressure P4. The yaw brakes B4-B6 which are arranged downstream of said second actuating element all experience the operating pressure P4 and accordingly they generate a tracking holding moment M4. To the extent that the return flow into the tank 501 occurs at zero pressure, M4=0.

The subfigure ii) represents the hydraulic configuration when the pressure conditions at the yaw brakes B1-B6 are reversed. For this purpose, switching means that are not shown are present, in order to produce the represented reversal of the direction of flow. For this purpose, reference is made to FIG. 6b), for example, which shows an example of such a reversal. Moreover, switching means are present for the purpose of disconnecting the actuating elements 810 and 820 from the hydraulic circuit, and instead connecting the actuating elements 830 and 840. The actuating element 830 is a pressure reducing valve which reduces the operating pressure P1 pplied on the inlet side to an operating pressure P3, which is applied to the downstream yaw brakes B6, B5 and B4, so that these yaw brakes generate a tracking holding moment M3. A second pressure reducing valve 840 is connected downstream of the yaw brake B3, and it reduces the applied operating pressure P3 to a lower operating pressure P4, which is applied to the downstream yaw brakes B3, B2 and B1.

A second, alternative variant is shown in FIG. 8b). The hydraulic unit 500 applies an operating pressure P1 to the actuating element 850. The actuating element 850 is a pressure reducing valve which lowers the operating pressure P1 to an operating pressure P3. A two-way valve 860 is connected downstream of the actuating element 850. In the represented first switch position i), the operating pressure P3 is allowed to pass through, and the operating pressure P3 is applied to the yaw brakes B1-B3. In the represented switch position i), a second two-way valve 870 connects the hydraulic line to the tank and it bridges the downstream yaw brakes B4-B6; the hydraulic fluid can then flow back to the tank directly, wherein, for the purpose of maintaining the operating pressure P3, this return flow is prevented by an appropriate actuating element which is not shown, for example, a nonreturn valve.

If the control device, not represented, switches the first two-way valve 860 into the second switch position, and also the second two-way valve 870 into the second switch position, the yaw brakes B1-B3 are bypassed, and the operating pressure P3 is applied exclusively to the yaw brakes B4-B6. Thus, the control device controls whether the yaw brakes B1-B3 or B4 B6 in each case generate a tracking holding moment M3. Between these two states it is possible, for example, to switch back and forth alternatingly between successive tracking movements, in order to achieve the most uniform possible loading of the yaw brakes B1-B6.

In order to be able to apply the standstill operating pressure P1 to all the yaw brakes B1-B6 in the variants of FIG. 8a) or FIG. 8b), additional actuating elements or switching means are required. In principle, this has already been explained in reference to the above examples, see, for example, FIGS. 6b) and 7a)-7d) and the associated description. One could proceed similarly in the embodiment examples of FIGS. 8a) and 8b).

The invention claimed is:

1. An apparatus for the controlled rotation of a nacelle of a wind turbine, having a control device and having a plurality of azimuth motors, wherein the apparatus furthermore has a plurality, amounting to n in number, of yaw brakes, wherein the control device is configured for standstill operation and for tracking operation, wherein in standstill operation, the n yaw brakes are actuated so as to impart a standstill holding moment M1 for holding the nacelle, wherein in standstill operation, the n yaw brakes impart in each case a substantially equal first holding moment, and wherein in tracking operation, the n yaw brakes are actuated so as to impart a tracking holding moment M2, wherein the tracking holding moment M2 is lower than the standstill holding moment M1

(M1>M2), and also lower than an overall moment generated by the azimuth motors in tracking operation, wherein the control device, in tracking operation, actuates a number m of the n yaw brakes in each case so as to generate substantially the same constant holding moment M3, wherein M1/n>M3>M2/n, and wherein the other (n−m) yaw brakes are actuated in each case so as to generate substantially the same constant holding moment M4, wherein m*M3+(n−m)*M4~=M2 and M1/n>M2/n>M4.

2. The apparatus according to claim 1, wherein the control device is configured to actuate the m yaw brakes, which are actuated for the generation of the respective holding moment M3 in a first tracking operation, in a subsequent tracking operation for the generation of the respective holding moment M4, and to actuate the (n−m) yaw brakes actuated in the first tracking operation to M4 in the subsequent tracking operation for the generation of the holding moment M3.

3. The apparatus according to claim 2, wherein the first tracking operation is followed by a standstill operation, and then the standstill operation is followed by the subsequent tracking operation.

4. The apparatus according to claim 1, wherein (n−m) is approximately equal to m.

5. The apparatus according to claim 1, wherein M4~=0.

6. The apparatus according to claim 1, wherein the m and/or (n−m) yaw brakes are arranged substantially symmetrically about a rotation axis of the nacelle rotation.

7. The apparatus according to claim 1, wherein the plurality yaw brakes are hydraulic brakes with hydraulic actuation, which are arranged in a hydraulic supply circuit provided with actuating elements, and wherein the hydraulic supply circuit comprises a hydraulic unit, wherein the control device is designed so that the actuating elements are actuated for standstill operation in such a manner that all the yaw brakes are supplied with a standstill operating pressure P1, and in such a manner as to actuate the actuation elements for the tracking operation in such a manner that m yaw brakes are supplied with an operating pressure P3 and the other (n−m) yaw brakes are supplied with an operating pressure P4.

8. The apparatus according to claim 7, wherein the plurality of yaw brakes are arranged in two separate hydraulic circuits controlled by actuating elements, wherein m yaw brakes in a first hydraulic circuit are series connected with (n−m) yaw brakes in a second hydraulic circuit.

9. The apparatus according to claim 7, wherein the n yaw brakes are series connected in a double peripheral ring, wherein each ring is controlled by an actuating element.

10. The apparatus according to claim 7, wherein, in the hydraulic supply circuit, between a first and an $n^{th}$ yaw brake, only actuating elements which are not actuated by the control device are arranged.

11. The apparatus according to claim 10, wherein all the yaw brakes are series connected in a hydraulic circuit, wherein, between an $m^{th}$ and an $(m+1)^{th}$ yaw brake, a pressure limiting valve with a parallel connected nonreturn valve is arranged as an actuating element, wherein a locking direction of the nonreturn valve corresponds to an open direction of the pressure limiting valve, and wherein, in the hydraulic circuit, the actuating element and hydraulic lines are provided and controlled by the control device in such a manner that, in standstill operation, the standstill operating pressure P1 is applied, bypassing the pressure limiting valve, through the nonreturn valve to all n yaw brakes, wherein, in tracking operation, the operating pressure P3 is applied to the m yaw brakes up to the pressure limiting valve, bypassing the nonreturn valve.

12. The apparatus according to claim 11, wherein, in addition to the hydraulic unit, a pressure reservoir is arranged in the hydraulic circuit, whose pressure input point is located in the flow direction of the tracking operation before the pressure limiting valve.

* * * * *